United States Patent
Cambot-Courrau

[11] Patent Number: 6,145,887
[45] Date of Patent: Nov. 14, 2000

[54] DEVICE FOR FAST CONNECTION OF A TUBE TO A RIGID ELEMENT WITH ANTI-EXTRACTION RING AND SAFETY SEAL

[75] Inventor: Yves Cambot-Courrau, Thorigne-Fouillard, France

[73] Assignee: Legris S.A., Rennes, France

[21] Appl. No.: 09/331,854

[22] PCT Filed: Dec. 8, 1998

[86] PCT No.: PCT/FR98/02654

§ 371 Date: Jun. 28, 1999

§ 102(e) Date: Jun. 28, 1999

[87] PCT Pub. No.: WO99/30071

PCT Pub. Date: Jun. 17, 1999

[30] Foreign Application Priority Data

Dec. 11, 1997 [FR] France .................................. 97 15721

[51] Int. Cl.[7] .................................................. F16L 35/00
[52] U.S. Cl. .............................. 285/4; 285/81; 285/308; 285/340
[58] Field of Search ............................ 285/3, 4, 80, 81, 285/82, 308, 340, 117

[56] References Cited

U.S. PATENT DOCUMENTS

| | | | |
|---|---|---|---|
| 2,067,028 | 1/1937 | Talaga | 285/80 |
| 2,413,730 | 1/1947 | Samiran | 285/82 |
| 4,305,606 | 12/1981 | Legris | 285/81 |
| 4,872,710 | 10/1989 | Konecny et al. | 285/81 |
| 4,886,113 | 12/1989 | Ross et al. | 285/3 |
| 5,487,572 | 1/1996 | Legris | |
| 5,662,358 | 9/1997 | Lees et al. | 285/3 |
| 5,863,077 | 1/1999 | Szabo et al. | 285/4 |

FOREIGN PATENT DOCUMENTS

| | | | |
|---|---|---|---|
| 0160559 | 6/1985 | European Pat. Off. | |
| 558844 | 9/1993 | European Pat. Off. | 285/81 |

Primary Examiner—Dave W. Arola
Attorney, Agent, or Firm—Birch, Stewart, Kolasch & Birch, LLP

[57] ABSTRACT

The invention relates to a quick-coupling device for coupling a tube to a rigid element (50) having a bore, the device comprising a tubular insert (1) having means (7) enabling it to be anchored in the bore of the rigid element (50), declutchable tube retaining means (11), and a slide (13) mounted to move in translation in the tubular insert (1) to declutch the retaining means (11) when it is pushed into the tubular insert (1). The declutching slide (13) possesses a rear portion which projects outside the tubular insert (1) and which presents a shoulder surface (23) situated facing an end surface (24) of the tubular insert (1) and co-operating with said end surface to define a groove in which a removable intermediate ring (25) is received to oppose pushing in of the declutching slide (13).

3 Claims, 1 Drawing Sheet

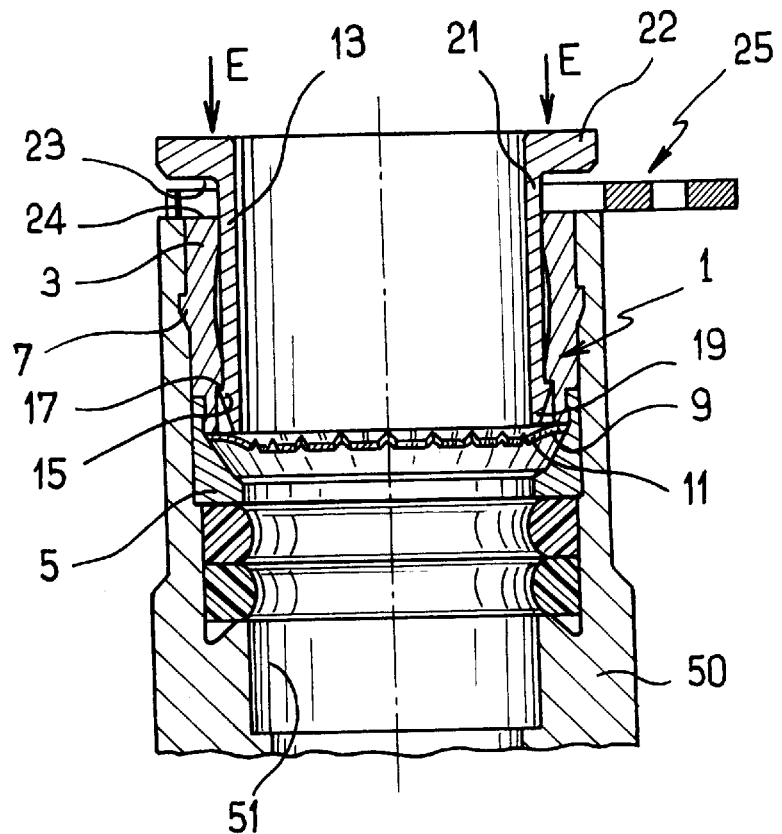
FIG_1
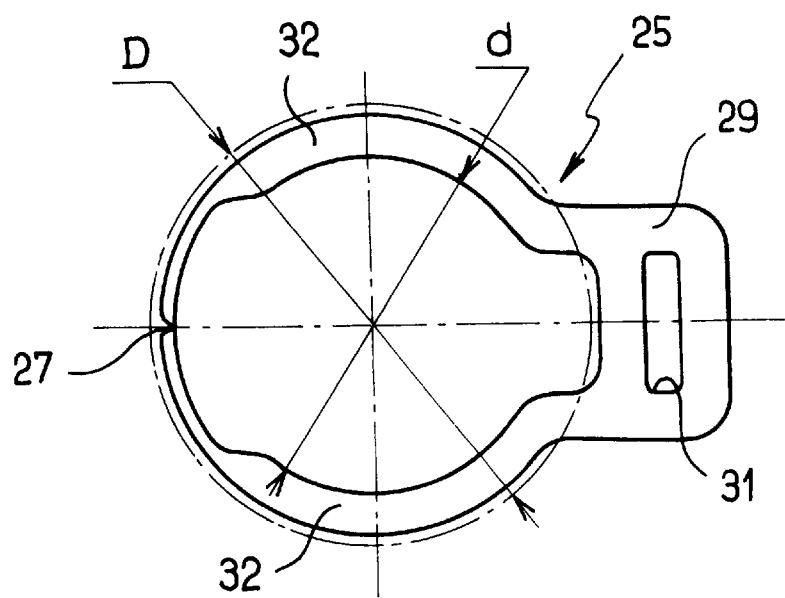
FIG_2

DEVICE FOR FAST CONNECTION OF A TUBE TO A RIGID ELEMENT WITH ANTI-EXTRACTION RING AND SAFETY SEAL

The present invention relates to a quick-coupling device for coupling a tube to a rigid element (e.g. the body of a pneumatic component such as a manifold, an actuator, etc.), and it relates more particularly to a quick-coupling device of the "cartridge" type designed to anchor a tube in a bore of the rigid element and to seal the resulting coupling.

BACKGROUND OF THE INVENTION

Quick-coupling devices of the "cartridge" type are known that are designed to couple a tube in leakproof manner in a bore of a rigid element, where the coupling is in the form of a tubular insert comprising a tubular body possessing means for anchoring it permanently in the rigid element, and means for retaining the tube.

The tube retaining means are often implemented in the form of a washer having inside teeth, which teeth are raised by bending when the tube is inserted and tend to bite into the tube to oppose extraction thereof. When it is subsequently desired to disconnect the tube, a slide is pushed between the tube and the body, thereby enabling the teeth to be raised so as to release the tube.

Nevertheless, in practice there is a risk of the slide being pushed in accidentally, thereby causing the tube to be disconnected in untimely manner. Such an accidental disconnection can have severe consequences insofar as it leads not only to the appearance of a large leak, but also interrupts operation of the pneumatic component that was being powered via the coupling.

OBJECTS AND SUMMARY OF THE INVENTION

An object of the present invention is to improve the safety of coupling devices of the above-specified type by preventing the slide for splaying open the retaining washer being pushed in accidentally.

According to the invention, this object is achieved by a quick-coupling device for coupling a tube to a rigid element having a bore, the device comprising a tubular insert having means enabling it to be anchored in the bore of the rigid element, declutchable tube retaining means, and a slide mounted to move in translation in the tubular insert to declutch the retaining means when it is pushed into the tubular insert, in which device the declutching slide possesses a rear portion which projects outside the tubular insert and which presents a shoulder surface situated facing an end surface of the tubular insert and co-operating with said end surface to define a groove in which a removable intermediate ring is received to oppose pushing in of the declutching slide.

In this way, any force tending to push in the declutching slide causes the surface of the slide shoulder to be pressed against the removable intermediate ring, which in turn is pressed against the end surface of the tubular insert and/or a surface of the rigid element. It is consequently not possible to push in the slide and thus declutch the retaining means so long as the removable intermediate ring is in position around the declutching slide.

Advantageously, the removable intermediate ring is closed, and has a mechanically weak portion forming a break starter which, once broken, enables said ring to be removed.

Breaking the ring thus indicates that the ring has been disengaged so as to be able to disconnect the tube. Integrity of the break starter on the ring therefore indicates that the device is intact. In particular, any unauthorized action on the coupling device can easily be detected.

Preferably, the removable intermediate ring has an outline provided with a pull tab. The removable intermediate ring is thus made easier to remove.

It is then advantageous for a slot to pass through the thickness of the pull tab of the removable intermediate ring. A tool can then be inserted in the slot in order to further facilitate removing the removable intermediate ring.

According to an additional characteristic of the invention, the removable intermediate ring has two branches which, after the weak portion has been broken, can be moved elastically apart from each other, and which are suitable for snap-fastening around the declutching slide. Thus, after the removable intermediate ring has been withdrawn to enable the tube to be disconnected, it can be put back into position around the declutching slide merely by elastic deformation, without any need to use a special tool.

BRIEF DESCRIPTION OF THE DRAWINGS

Other characteristics and advantages of the invention appear on reading the following description of a particular, non-limiting embodiment of the invention.

Reference is made to the accompanying drawing, in which:

FIG. 1 is a longitudinal section view of a quick-coupling device of the invention, inserted in a rigid element; and FIG. 2 is a plan view of the removable intermediate ring.

MORE DETAILED DESCRIPTION

With reference to the figures, the quick-coupling device for coupling a tube to a rigid element 50 comprises a tubular insert 1 designed to be received in a bore 51 of the rigid element 50.

In this case, the insert 1 has two portions: a tubular body 3, and at the front of the body relative to the direction in which the insert 1 is inserted into the bore 51, a nose 5. The outside face of the body 3 is fitted with projections 7 in a Christmas tree shape for anchoring in the bore 51.

The body 3 and the nose 5 define between them a groove 9 which constitutes a housing for a washer 11 fitted with teeth for gripping and retaining the tube. The washer 11 is conventional, being elastically deformable and substantially frustoconical towards the front, i.e. towards the inside of the bore 51. Its inner circumference is of a diameter that is smaller than the diameter of the tube, thereby enabling it to "bite" into the tube and hold it against an extraction force.

A tubular declutching slide 13 is mounted to slide axially inside the body 3 of the insert 1. This slide is movable between an inactive rear position and an active front position. In its rear position, as shown in FIG. 1, the slide 13 has a shoulder 15 that comes into abutment against a shoulder 17 of the portion 3. The washer 11 is then merely ready to come into abutment against the front end 19 of the slide 13, thereby preventing the washer 11 being turned inside out if a high traction force is applied to the coupled tube. When the slide 13 is pushed forwards into its front position, i.e. into the bore 51, as symbolized by arrows E in FIG. 1, the shoulders 15 and 17 are spaced apart from each other and the end 19 of the slide 13 pushes against and raises the teeth of the washer 11 to splay open the washer, thereby releasing the tube with which it was engaged. The inside diameter of the declutching slide 13 is slightly greater than the outside diameter of the tube to be coupled.

The declutching slide 13 has a rear end portion 21 which projects from the rear end face 24 of the tubular body 3. This projecting portion 21 has a flange 22 which presents a shoulder surface 23 facing the rear face 24 of the body 3 of the tubular insert 1.

A closed removable intermediate ring 25 of elastically deformable material extends around the declutching slide 13 between the shoulder surface 23 and the end face 24 of the tubular body 3. The inside diameter d of the removable intermediate ring 25 is slightly greater than the outside diameter of the tubular portion of the declutching slide 13 and smaller than the diameter D of the outline of the shoulder surface 23 (shown as a chain-dotted line in FIG. 2).

The removable intermediate ring 25 has a portion of mechanical weakness 27. This portion is implemented in this case by locally reducing the width of the ring so as to form a break starter point. It would also be possible to weaken the material from which the ring is made.

In addition, the removable intermediate ring 25 is provided on a side diametrically opposite from the weak portion 27, with a pull tab 29 extending laterally from the removable intermediate ring 25. A slot 31 passes through the thickness of the pull tab 29 so as to make it easier to manipulate it with a tool.

Installation of the quick-coupling device on the rigid element 50 begins by inserting the tubular insert 1 in the bore 51 of the rigid element 50.

A tube is then inserted in the quick-coupling device through the declutching slide 13, and it deforms the teeth of the washer 11 which thus bite into the outside surface of the tube.

To release the tube, the user can, for example, insert a screwdriver blade in the slot 31 and use leverage to apply a traction force on the removable intermediate ring. The traction force causes the weak portion 27 to break. When the portion 27 breaks, the ring is split into two branches 32 which can be moved elastically far enough apart from each other to allow the ring 25 to be taken away transversely. The declutching slide 13 can then be pushed in to splay out the retaining washer and thus release the tube. The broken portion thus shows that the declutching slide 13 has been pushed in deliberately.

If the user so desires, the tube can be reconnected and the removable intermediate ring 25 can be snapped back into position around the tubular portion of the declutching slide 13.

Naturally, the invention is not limited to the embodiment described above, but on the contrary covers any variant using equivalent means to reproduce its essential characteristics.

In particular, although the removable intermediate ring 25 is shown as being closed and having a portion of mechanical weakness, it would be possible to make an intermediate ring that is split, having from the start an opening of smaller size than the outside diameter of the tubular portion of the slide so as to enable the split ring to be snapped resiliently onto the slide.

In particular, although the removable intermediate ring 25 is shown as being closed and as having a portion of mechanical weakness, it would be possible to make an intermediate ring that is split having, from the start, an opening of smaller size than the outside diameter of the tubular portion of the slide so as to enable the split ring to be snapped resiliently onto the slide.

What is claimed is:

1. A quick-coupling device for coupling a tube to a rigid element (50) having a bore, the device comprising a tubular insert (1) having means (7) enabling it to be anchored in the bore of the rigid element (50), declutchable tube retaining means (11), and a slide (13) mounted to move in translation in the tubular insert (1) to declutch the retaining means (11) when it is pushed into the tubular insert (1), said slide (13) possessing a rear portion which projects outside the tubular insert (1) and which presents a shoulder surface (23) situated facing an end surface (24) of the tubular insert (1) and co-operating with said end surface to define a groove in which a removable intermediate ring (25) is received to oppose pushing in of the declutching slide (13), said ring being closed and having a mechanically weak portion (27) forming a break starter which, once broken, divides said ring into two elastic branches and enables said ring to be removed.

2. The device of claim 1, wherein the removable intermediate ring (25) has an outline provided with a pull tab (29).

3. The device of claim 2, wherein a slot (31) passes through the thickness of the pull tab (29) of the removable intermediate ring (25).

* * * * *